(12) United States Patent
Lee et al.

(10) Patent No.: US 7,386,239 B2
(45) Date of Patent: Jun. 10, 2008

(54) CHIRPED RZ-AMI OPTICAL TRANSMITTER

(75) Inventors: Han-Lim Lee, Seoul (KR); Hoon Kim, Suwon-si (KR); Seong-Taek Hwang, Pyeongtaek-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 423 days.

(21) Appl. No.: 11/240,072

(22) Filed: Sep. 30, 2005

(65) Prior Publication Data

US 2006/0083519 A1 Apr. 20, 2006

(30) Foreign Application Priority Data

Oct. 20, 2004 (KR) .................... 10-2004-0083926

(51) Int. Cl.
*H04B 10/04* (2006.01)
(52) U.S. Cl. .................. 398/183; 398/193; 398/201
(58) Field of Classification Search ................ 398/183, 398/185, 186, 193, 198, 200, 201, 161, 154
See application file for complete search history.

(56) References Cited

U.S. PATENT DOCUMENTS

| | | | |
|---|---|---|---|
| 6,559,996 B1 * | 5/2003 | Miyamoto et al. .......... 398/183 |
| 6,804,472 B1 * | 10/2004 | Ho ............................ 398/193 |
| 6,847,312 B2 * | 1/2005 | Lenz et al. .................... 341/50 |
| 2004/0061922 A1 * | 4/2004 | Mauro et al. ................ 359/279 |
| 2004/0101315 A1 * | 5/2004 | Kim et al. .................... 398/183 |
| 2005/0002676 A1 * | 1/2005 | Zitelli ......................... 398/188 |

FOREIGN PATENT DOCUMENTS

JP 2000-106543 4/2000

OTHER PUBLICATIONS

Winzer, P.; et al.; "40-Gb/s Return-to-Zero Alternate-Mark-Inversion (RZ-AMI) Transmission Over 2000 km;" IEEE Photonics Technology Letters, vol. 15, No. 5; May 2003.
Winzer, P.; et al.; "Chirped Return-to-Zero Modulation by Imbalanced Pulse Carver Driving Signals;" IEEE Photonics Technology Letters, Vo. 16, No. 5; May 2004.

* cited by examiner

*Primary Examiner*—Dalzid Singh
(74) *Attorney, Agent, or Firm*—Cha & Reiter, LLC (57) ABSTRACT

A chirped RZ-AMI optical transmitter includes a first logic gate for receiving a first signal obtained by pre-coding binary data and a second signal having a waveform obtained by inverting and delaying the first signal, and outputting a third signal obtained by logically operating on the first and second signals. A second logic gate receives a fourth signal having a waveform obtained by inverting the first signal, and a fifth signal having a waveform obtained by delaying the first signal. The second logic gate outputs a sixth signal obtained by logically operating on the fourth and fifth signals. A Mach-Zehnder Modulator (MZM) modulates an input light according to the third and sixth signals and outputs an RZ-AMI optical signal.

20 Claims, 9 Drawing Sheets

CHIRPED RZ-AMI OPTICAL TRANSMITTER

CLAIM FOR PRIORITY

This application claims priority to an application entitled "Chirped RZ-AMI Optical Transmitter," filed in the Korean Intellectual Property Office on Oct. 20, 2004 and assigned Serial No.2004-83926, the contents of which are incorporated herein by reference.

BACKGROUND OF THE INVENTION

1. Field of the Invention

The present invention relates to an optical transmitter, and more particularly to an optical transmitter using a Mach-Zehnder Modulator (MZM).

2. Description of the Related Art

Figure 1:
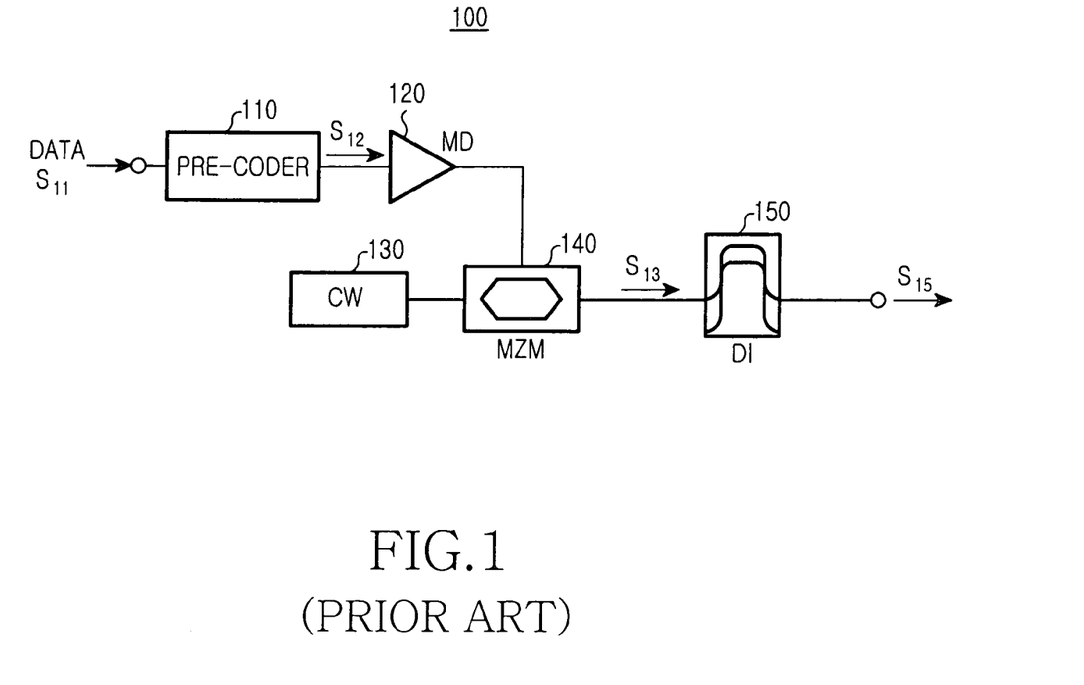
FIG. 1 is a block diagram showing the basic construction of a typical RZ-AMI optical transmitter using an MZM and a DI.
Figure 2:
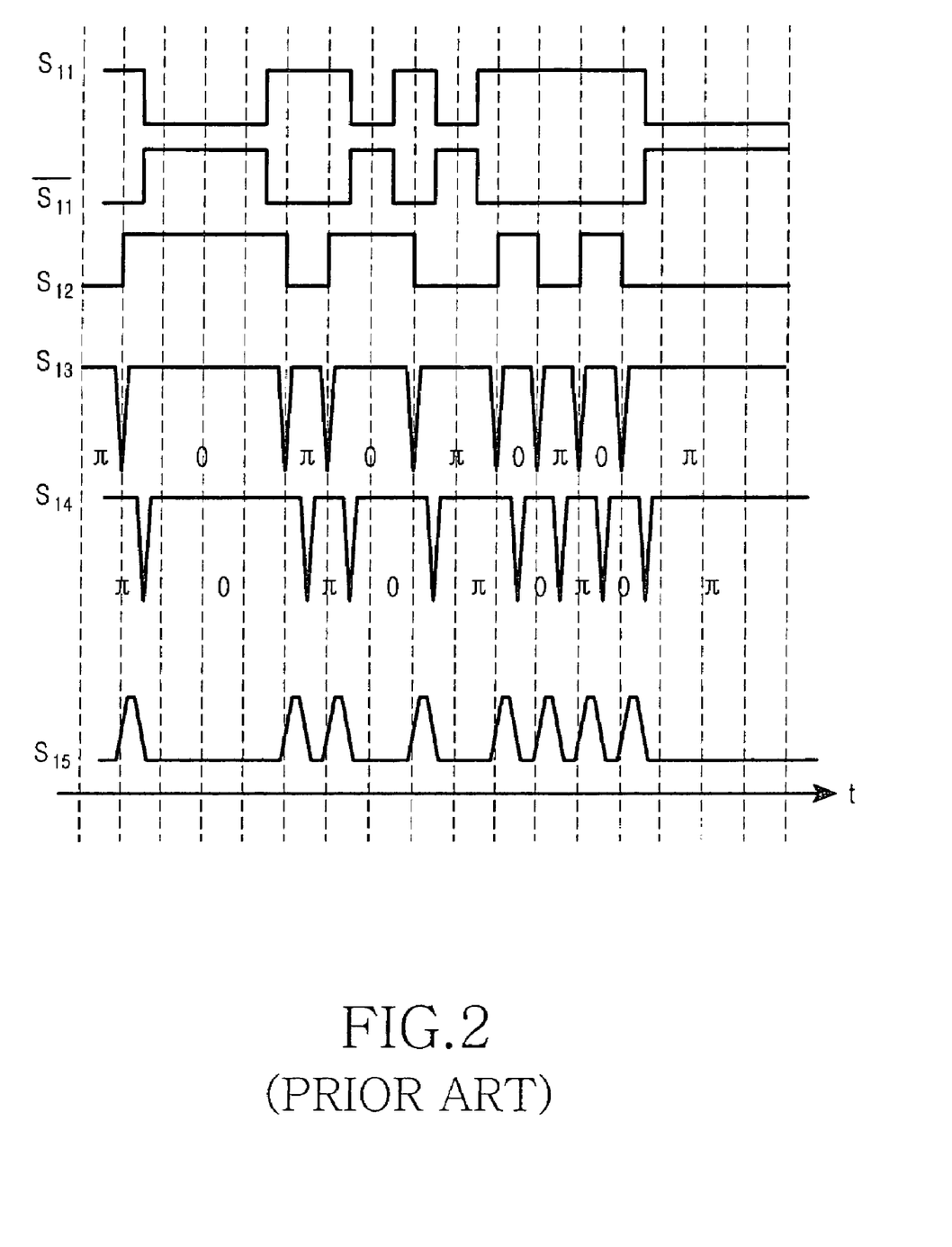
FIG. 2 is a timing diagram showing processing signals of the RZ-AMI optical transmitter of FIG. 1.

FIG. 1 is a block diagram showing the basic construction of a typical Return-to-Zero Alternate-Mark-Inversion (RZ-AMI) optical transmitter using an MZM and a Delay Interferometer (DI), and FIG. 2 is a diagram showing processing signals of the RZ-AMI optical transmitter shown in FIG. 1. The RZ-AMI optical transmitter 100 includes a pre-coder 110, a modulator driver 120, a Continuous Wave (CW) laser 130, an MZM 140 and a DI 150.

The pre-coder 110 pre-codes and outputs binary data $S_{11}$ which are input Non-Return-to-Zero (NRZ) signals. The modulator driver 120 receives the input from the pre-coder 110, amplifies it and outputs the amplified signal as a pre-coded signal $S_{12}$. The pre-coder 110 may include a 1-bit delay element and an exclusive-OR element. The MZM 140 intensity & phase-modulates and outputs, according to the amplified signal, a light input from the CW laser 130. The bias position of the MZM 140 is located at a null point corresponding to a minimum value in a transfer characteristic function of the MZM 140. The DI 150 splits the modulated $S_{13}$ input from the MZM 140 into a first and a second optical signal, delays the first optical signal by 0.5 bit, i.e., one half of a bit period, and outputs an optical signal $S_{15}$ obtained by combining the first delayed optical signal and the second optical signal so that they destructively interfere. Then, an RZ-AMI optical signal is obtained by phase-modulating the destructively-interfered optical signal $S_{15}$ each bit by means of a phase modulator so that the optical signal $S_{15}$ has an inversed phase. The RZ-AMI modulation scheme known in the art has characteristics in which an optical signal includes intensity information and a phase of the optical signal is inverted alternately with each bit. In particular, in indicating the intensity of an RZ-AMI optical signal, as in the case of an RZ signal, a shift in energy of the RZ-AMI optical signal from a level 0 to a level 1, with a subsequent return to the level 0, indicates a single bit. Accordingly, since the RZ-AMI optical signal has the same change of intensity as that in the RZ signal, the RZ-AMI optical signal has an advantage in an RZ modulation scheme. For example, the RZ-AMI optical signal is tolerant to a non-linearity of an optical fiber in a transmission system having a data speed more than 20 Gb/s. Further, since the phase of the optical signal is inverted alternately each bit, a frequency component of a carrier is suppressed. Therefore, the RZ-AMI optical signal is tolerant to not only the Brillouin non-linearity effect but also the non-linearity effect such as the Intra-channel Four-Wave-Mixing (IFWM) and the Intra-channel Cross-Phase-Modulation (IXPM).

However, the RZ-AMI optical transmitter 100 as described above is expensive due to the expensive parts, particularly the MZM 140, the DI 150 and the phase modulator. Therefore, a system with the RZ-AMI optical transmitter 100 tends to require a non-competitive price.

Since a chirped RZ signal has been known to be tolerant to the non-linearity effect, it is observed by the present inventors that the RZ-AMI optical signal may also have the same advantages. Accordingly, a chirped RZ-AMI modulation scheme may be a very superior modulation scheme having advantages of a chirped RZ signal and an RZ-AMI optical signal. What is needed is a chirped RZ-AMI optical transmitter that is low-priced and tolerant to the non-linearity effect.

SUMMARY OF THE INVENTION

The present invention has been made to solve the above-mentioned problems occurring in the prior art, and, in one aspect, the present invention provides a chirped RZ-AMI (Return-to-Zero Alternate-Mark-Inversion) optical transmitter having two logic gates and a Mach-Zehnder Modulator (MZM). The first logic gate receives a first signal obtained by pre-coding binary data, and a second signal having a waveform obtained by inverting and delaying the first signal. An output signal is obtained by logically operating on the first and second signals. A second logic gate receives a fourth signal having a waveform obtained by inverting the first signal, and a fifth signal having a waveform obtained by delaying the first signal. A sixth signal is obtained by logically operating on the fourth and fifth signals. The MZM modulates, according to the third and sixth signals, inputted light and outputs an RZ-AMI optical signal.

In accordance with another aspect of the present invention, there is provided a chirped RZ-AMI (Return-to-Zero Alternative-Mark-Inversion) optical transmitter having a first logic gate for receiving a first signal obtained by pre-coding binary data and a second signal having a waveform obtained by inverting and delaying the first signal. A third signal for output is obtained by logically operating on the first and the second signals. A second logic gate receives a fourth signal having a waveform identical to a waveform of the second signal and a fifth signal having a waveform identical to a waveform of the first signal. A sixth signal for output is obtained by logically operating on the fourth and the fifth signals. A Mach-Zehnder Modulator (MZM) modulates, according to the third signal and sixth signals, inputted light and outputs an RZ-AMI optical signal.

BRIEF DESCRIPTION OF THE DRAWINGS

The above features and advantages of the present invention will be more apparent from the following detailed description taken in conjunction with the accompanying drawings, in which the same or similar features are annotated with like reference numbers throughout the several views.

DETAILED DESCRIPTION

For the purposes of clarity and simplicity, detailed description of known functions and configuration incorporated herein is omitted for clarity of presentation.

Figure 3:
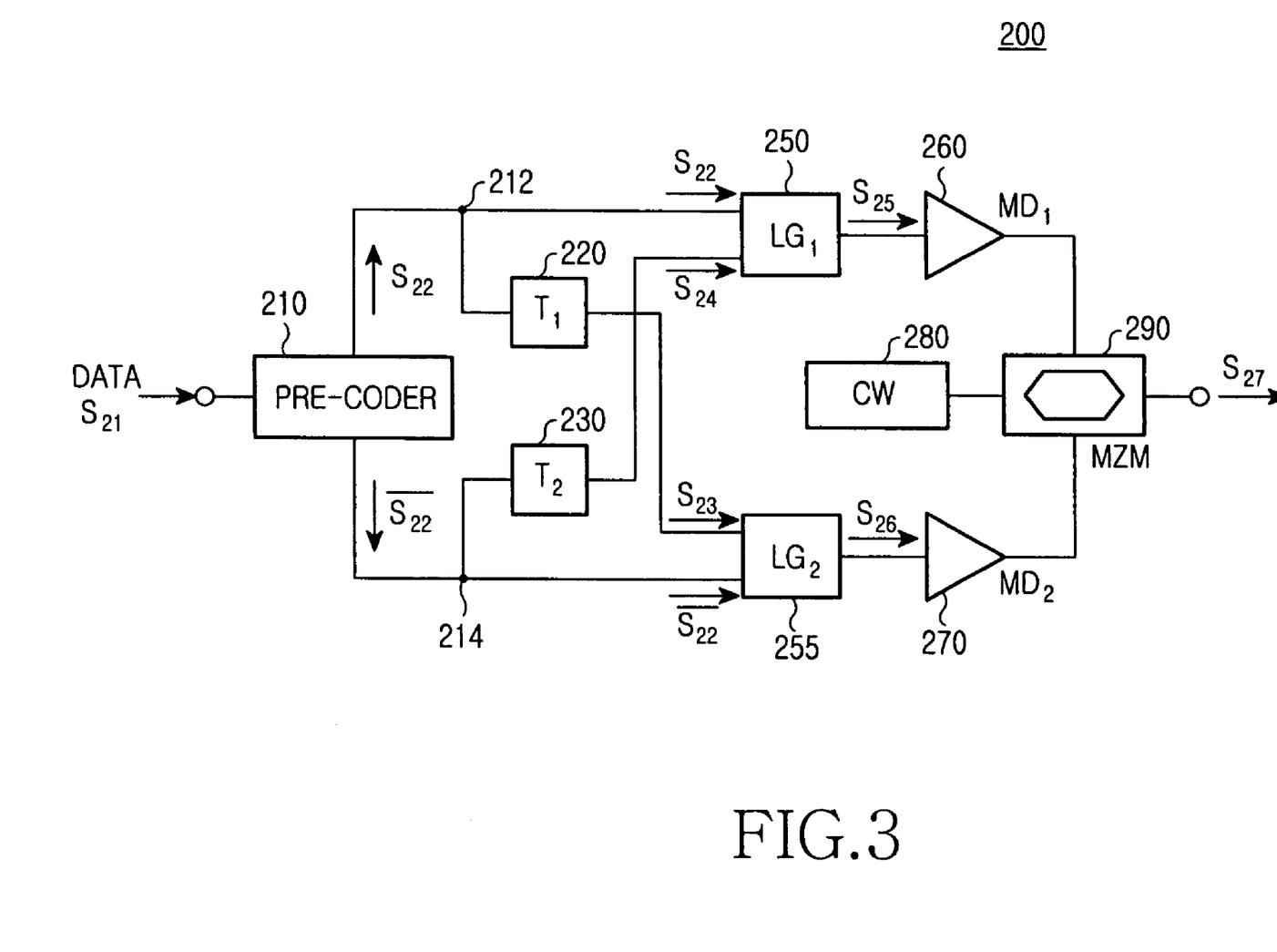
FIG. 3 is a block diagram showing a chirped RZ-AMI optical transmitter according to a first preferred embodiment of the present invention.

FIG. 3 is a block diagram showing a chirped RZ-AMI optical transmitter according to a first preferred embodiment of the present invention.

The chirped RZ-AMI optical transmitter 200 includes a pre-coder 210, a first and a second branching means 212, 214, a first and a second delay 220, 230, a first and a second logic gate 250, 255, a first and a second modulator driver 260, 270, a CW laser 280, and an MZM 290.

The pre-coder 210 pre-codes input NRZ binary data $S_{21}$, divides the pre-coded signal (or 2 level signal) into two branch signals, inverts one of the branch signals, and outputs the remaining branch signal (non-inverted signal) $S_{22}$ and the inverted signal $\overline{S}_{22}$. The pre-coder 210 may include a 1-bit delay element, an exclusive-OR element, a branching means (e.g., parallel connection of conductive wires) for dividing the outputs of the delay element and the exclusive-OR element into two branch signals, and an inverter for inverting one of the two branch signals.

The first branching means 212 divides the branch signal input from the pre-coder 210 into two branch signals. This may be accomplished through parallel connection of conductive wires.

The first delay 220 delays one of the branch signals having passed through the first branching means 212 by 0.5 bit, and outputs the delayed signal.

The second branching means 214 divides the inverted signal input from the pre-coder 210 into two branch signals. This may, as in the case of the first branching means 212, be accomplished through parallel connection of conductive wires.

The second delay 230 delays one of the branch signals having passed through the second branching means 214 by 0.5 bit, and outputs the delayed signal.

The first logic gate 250 receives the branch signal (first signal) $S_{22}$ having passed through the first branching means 212 and the delayed signal (second signal) $S_{24}$ input from the second delay 230. The first logic gate 250 logically operates on the received first and second signal to output the third signal $S_{25}$.

The second logic gate 255 receives the branch signal (fourth signal) $\overline{S}_{22}$ having passed through the second branching means 214 and the delayed signal (fifth signal) $S_{23}$ input from the first delay 220. The second logic gate 255 logically operates on the received fourth and fifth signal to output the sixth signal $S_{26}$.

The first modulator driver 260 amplifies the third signal $S_{25}$ input from the first logic gate 250.

The second modulator driver 270 amplifies the sixth signal $S_{26}$ input from the second logic gate 255.

The CW laser 280 outputs a light having a predetermined wavelength and the MZM 290 outputs a chirped RZ-AMI optical signal $S_{27}$ obtained by modulating, according to the amplified third and the sixth signals, the light input from the CW laser 280. The MZM 290 includes a dual-arm. The third signal is applied to one arm of the dual-arm, and the sixth signal is applied to the other arm of the dual-arm. The MZM 290 may have a z-cut structure having a dual-arm. The bias position of the MZM 290 is located at a null point corresponding to a minimum value of a modulator transfer characteristic.

Figure 6:
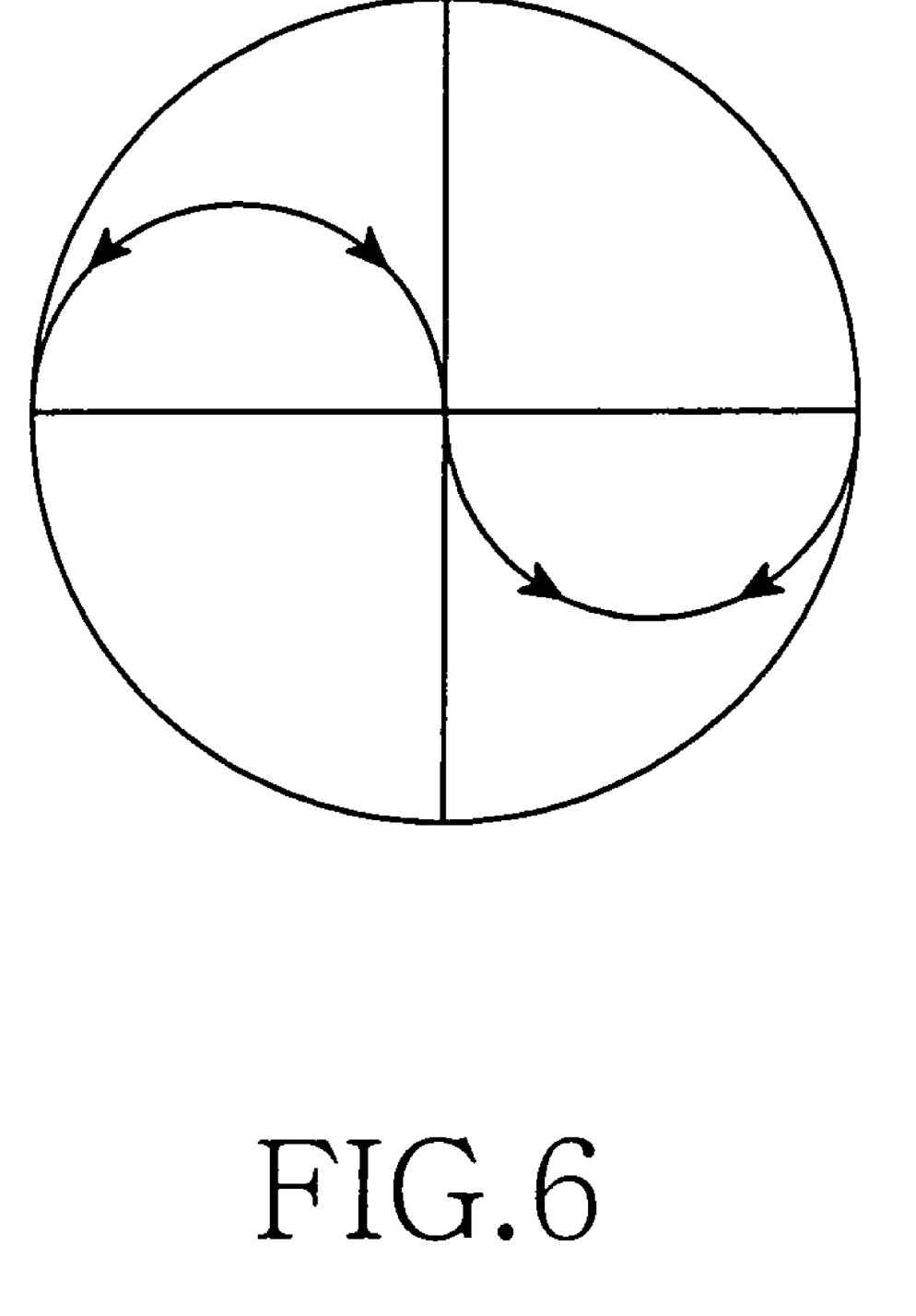
FIG. 6 is a polar map showing a positive chirp.
Figure 9:
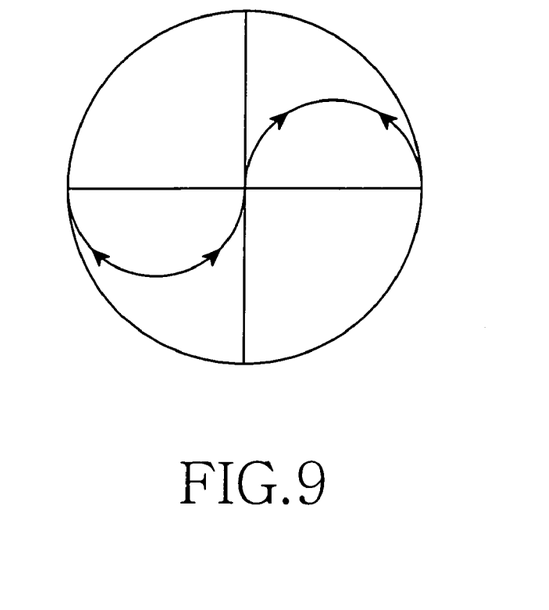
FIG. 9 is a polar map showing a negative chirp.

The electric field $S_{27}(E)$ of the chirped RZ-AMI optical signal is determined by a difference between waveforms of the third signal and the sixth signal output from the first and the second logic gates 250, 255. The phase $S_{27}(P)$ of the chirped RZ-AMI optical signal is determined by a sum of waveforms of the third signal and the sixth signal output from the first and the second logic gates 250, 255. A chirp characteristic of the chirped RZ-AMI optical signal changes according to combinations of the first and the second logic gates 250, 255, providing the chirped RZ-AMI optical signal with a positive chirp or a negative chirp. Hereinafter, the chirped RZ-AMI optical signal will be said to have positive chirp when it has a phase that increases as its intensity increases and decreases when the intensity decreases, i.e., a phase that varies directly with intensity. FIG. 6 shows a polar map representing positive chirp. By contrast, the chirped RZ-AMI optical signal has negative chirp when its phase varies inversely with intensity, so that phase increases when intensity decreases and such that phase decreases when intensity increases. FIG. 9 shows a polar map representing negative chirp.

When the delay times of the first and the second delay 220, 230 are set to correspond to about one half of a transmission speed of the chirped RZ-AMI optical signal, for example, about 12.5 ps in a case of a transmission speed of 40 Gb/s, an RZ of about 50% occurs. The duty cycle of the chirped RZ-AMI optical signal (RZ signal) may be adjusted by adjusting the delay times of the first and the second delay 220, 230. As is typical of the AMI signal, the phase of the chirped RZ-AMI optical signal inverts with each bit.

The optical transmitter 200 may be realized by means of various combinations of the first and the second logic gates 250, 255.

Figure 4:
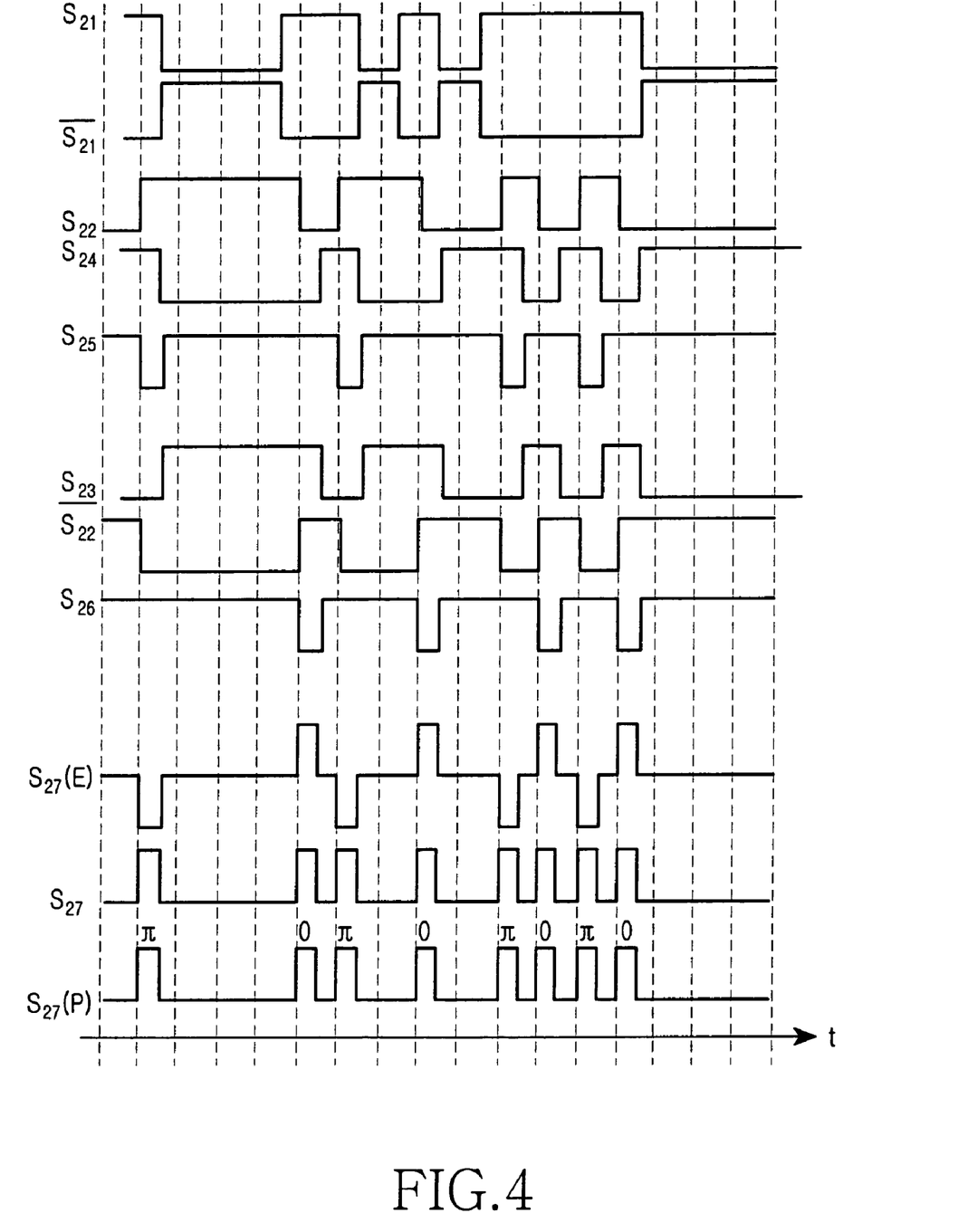
FIG. 4 is a timing diagram of signal processing for the optical transmitter in FIG. 3 according to a first combination of a first and a second logic gate.

FIG. 4 is a diagram showing processing signals of the optical transmitter 200 according to a first combination of the first and the second logic gates 250, 255. The first combination is the case in which NAND logic gates as employed as the first and the second logic gates 250, 255.

In particular, the first logic gate 250 receives the first signal $S_{22}$ having passed through the first branching means 212 and the second signal $S_{24}$ input from the second delay 230. The first logic gate 250, implemented as a NAND gate, outputs the third signal $S_{25}$ as a 0 bit when the first signal is a 1 bit and the second signal is a 1 bit. The first logic gate 250 outputs the third signal $S_{25}$ as a 1 bit in the other three case, i.e., when the first signal is a 1 bit and the second signal is a 0 bit, the first signal is a 0 bit and the second signal is a 1 bit, and the first signal is a 0 bit and the second signal is a 0 bit.

The second logic gate 255 receives the fourth signal $\overline{S}_{22}$ having passed through the second branching means 214 and the fifth signal $S_{23}$ input from the second delay 220. The second logic gate 255 outputs the sixth signal $S_{26}$ as a 0 bit when the fourth signal is 1 bit and the fifth signal is 1 bit. Likewise, in the other three cases, the second logic gate 255 outputs the sixth signal as 1 bit, i.e., when the fourth signal is a 1 bit and the fifth signal is a 0 bit, the fourth signal is a 0 bit and the fifth signal is a 1 bit, and the fourth signal is a 0 bit and the fifth signal is a 0 bit.

The NAND operation performed by each of the first and the second logic gates 250, 255 can be realized through a serial connection of a NOT logic gate and an AND logic gate. Since the intensity and the phase $S_{27}(P)$ of the chirped RZ-AMI optical signal $S_{27}$ output from the MZM 290 vary together, as evident from the bottom two waveforms in FIG. 6, it follows that the chirped RZ-AMI optical signal of the first combination of logic gates 250, 255 has positive chirp.

Figure 5:
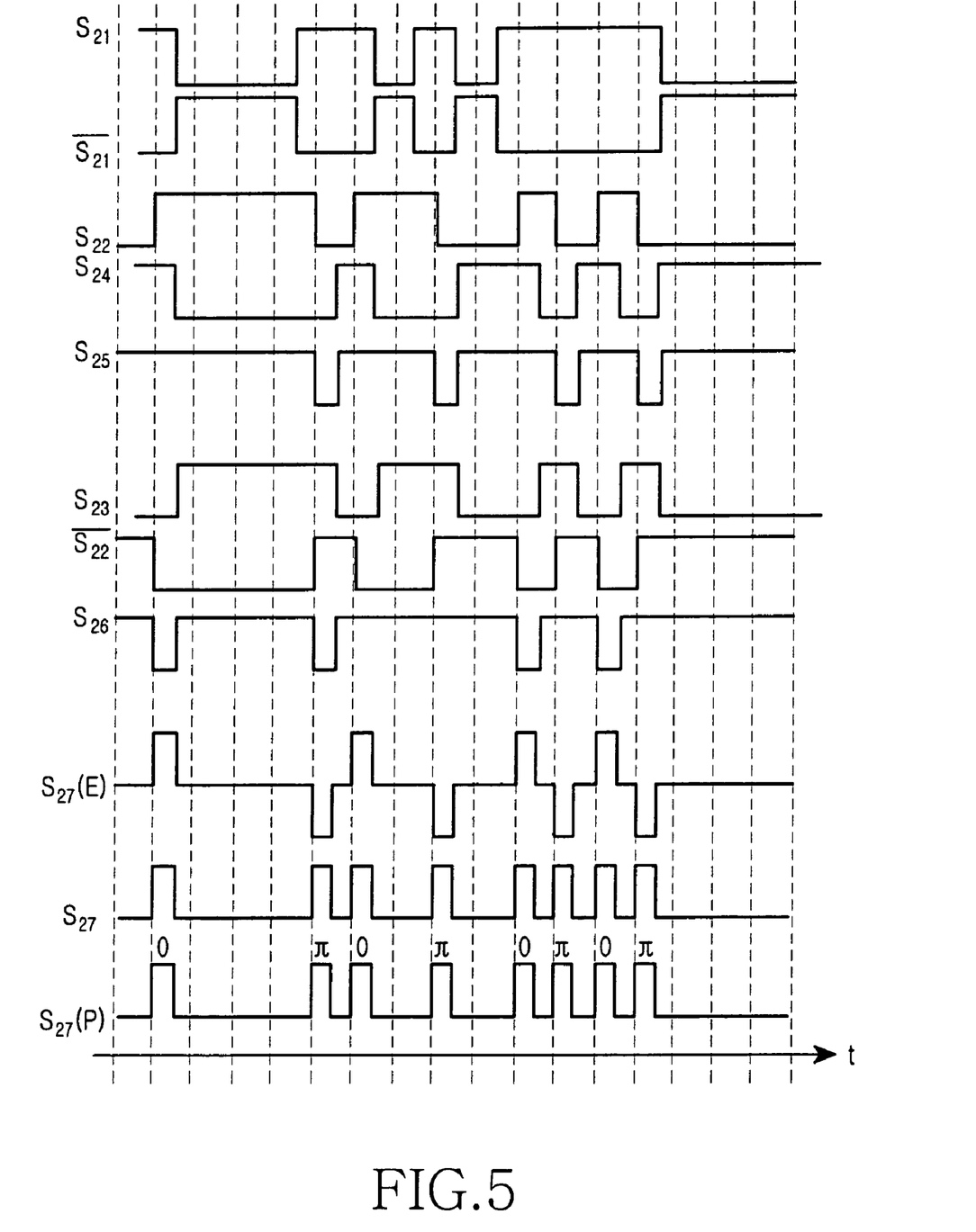
FIG. 5 is a timing diagram of signal processing for the optical transmitter in FIG. 3 according to a second combination of a first and a second logic gate.

FIG. 5 is a diagram showing processing signals of the optical transmitter 200 according to a second combination of the first and the second logic gate 250, 255, in which the second logic gates are implemented as OR logic gates.

As in the first combination, the first logic gate 250 receives the first signal $S_{22}$ having passed through the first branching means 212 and the second signal $S_{24}$ input from the second delay 230. The first logic gate 250, however, outputs the third signal $S_{25}$ as a 0 bit when at least one of the first and second signals is a 1 bit, and outputs the third signal as a 1 bit when the first signal is a 0 bit and the second signal is a 0 bit.

Again, as in the first combination, the second logic gate 255 receives the fourth signal $\overline{S}_{22}$ having passed through the second branching means 214 and the fifth signal $S_{23}$ input from the second delay 220. The second logic gate 255, however, outputs the sixth signal $S_{26}$ as a 0 bit when at least one of the fourth and fifth signals is a 1 bit, and outputs the sixth signal of 1 bit when the fourth signal is a 0 bit and the fifth signal is a 0 bit. Since the intensity and the phase $S_{27}(P)$ of the chirped RZ-AMI optical signal $S_{27}$ output from the MZM 290 vary directly, as shown in FIG. 6, one can see that the chirped RZ-AMI optical signal of the second combination has, like that of the first combination, positive chirp.

Figure 7:
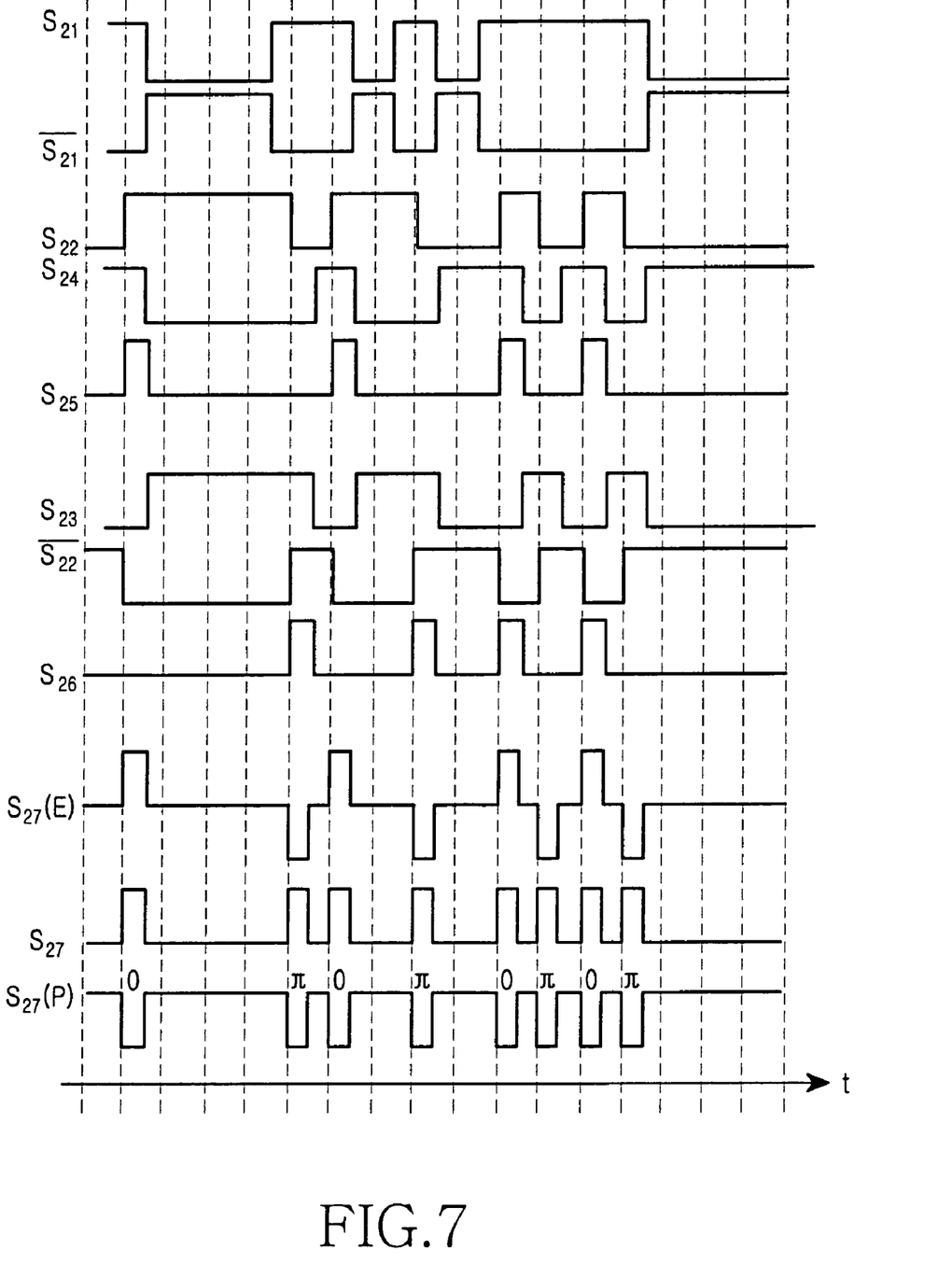
FIG. 7 is a timing diagram of signal processing for the optical transmitter shown in FIG. 3 according to a third combination of a first and a second logic gate.

FIG. 7 illustrates signal processing of the optical transmitter 200 according to a third combination of the first and the second logic gates 250, 255, which uses AND logic gates as the first and the second logic gates. The first logic gate 250 accordingly outputs the third signal $S_{25}$ as a 1 bit when the first signal is 1 bit and the second signal is 1 bit. The third signal is outputted as a 0 bit when one of the first and second signals is a 1 bit and the other is a 0 bit, , or when the first and second signals are both 0 bits. The second logic gate 255 operates analogously to output the sixth signal $S_{26}$ as a 1 bit when both the fourth and fifth signals are 1 bits, and to otherwise output the sixth signal as a 0 bit. Since the intensity and the phase $S_{27}(P)$ of the chirped RZ-AMI optical signal $S_{27}$ output from the MZM 290 of the third combination vary inversely, the chirped RZ-AMI optical signal has negative chirp as shown in FIG. 9.

Figure 8:
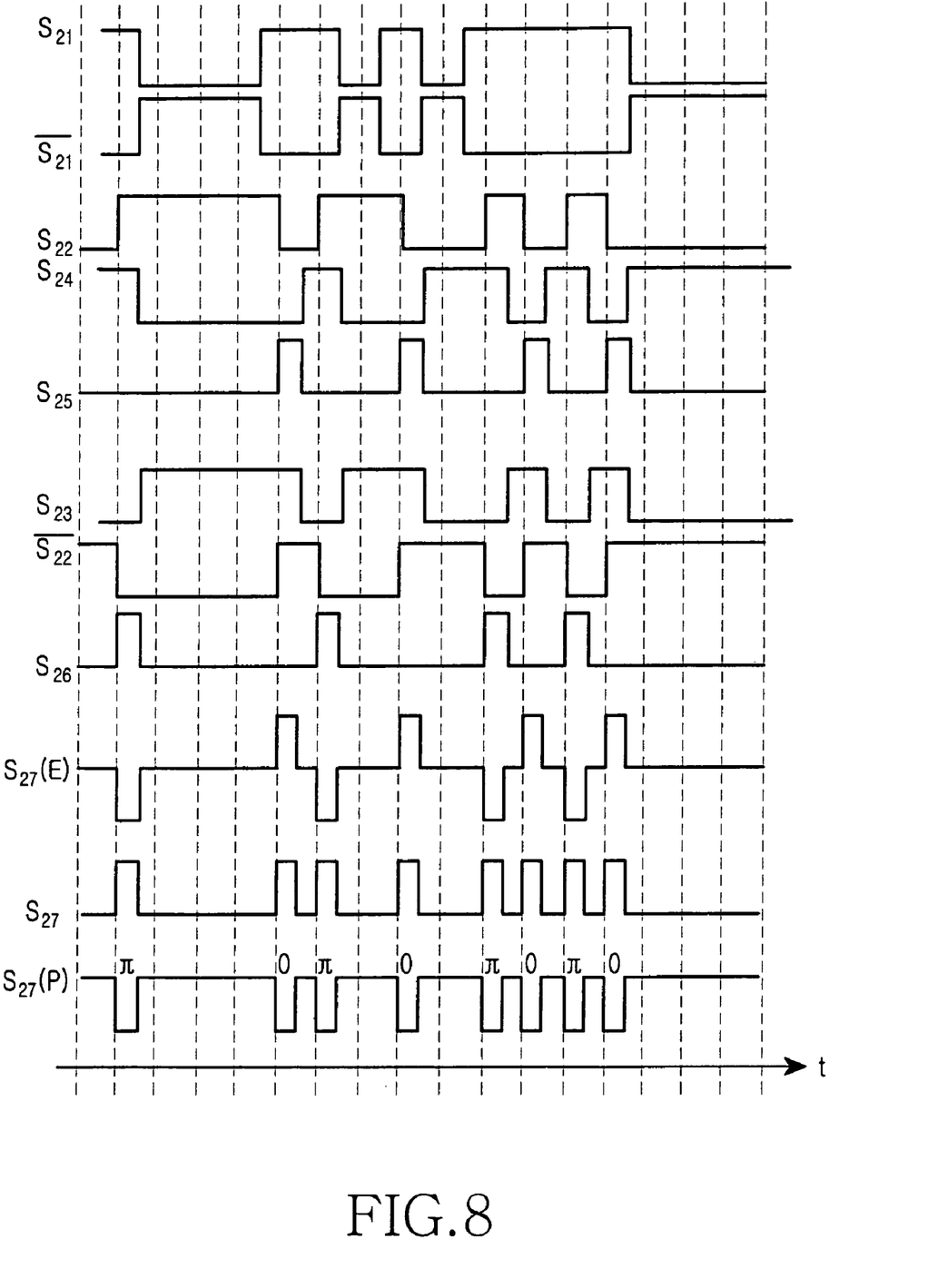
FIG. 8 is a timing diagram of signal processing for the optical transmitter shown in FIG. 3 according to a fourth combination of a first and a second logic gate.

FIG. 8 represents optical transmitter 200 signal processing according to a fourth combination of the first and the second logic gate 250, 255, the latter being implemented as NOR logic gates. The first logic gate 250 therefore outputs the third signal $S_{25}$ as a 1 bit when the first and second signals are 0 bits, and otherwise as a 1 bit. The second logic gate 255 analogously realizes NOR logic by the same input signals $S_{23}$, $\overline{S}_{22}$ described above for the first three combinations. Since the intensity and the phase $S_{27}(P)$ of the chirped RZ-AMI optical signal $S_{27}$ of the fourth combination output from the MZM 290 vary inversely, it follows that the chirped RZ-AMI optical signal has negative chirp as shown in FIG. 9.

The following table 1 represents formats and chirp signs for the first to the fourth combination.

TABLE 1

| | First logic gate | Second logic gate | format | Sign of chirp |
|---|---|---|---|---|
| First combination | NAND | NAND | AMI | Positive |
| Second combination | OR | OR | AMI | Positive |
| Third combination | AND | AND | AMI | Negative |
| Fourth combination | NOR | NOR | AMI | Negative |

Figure 10:
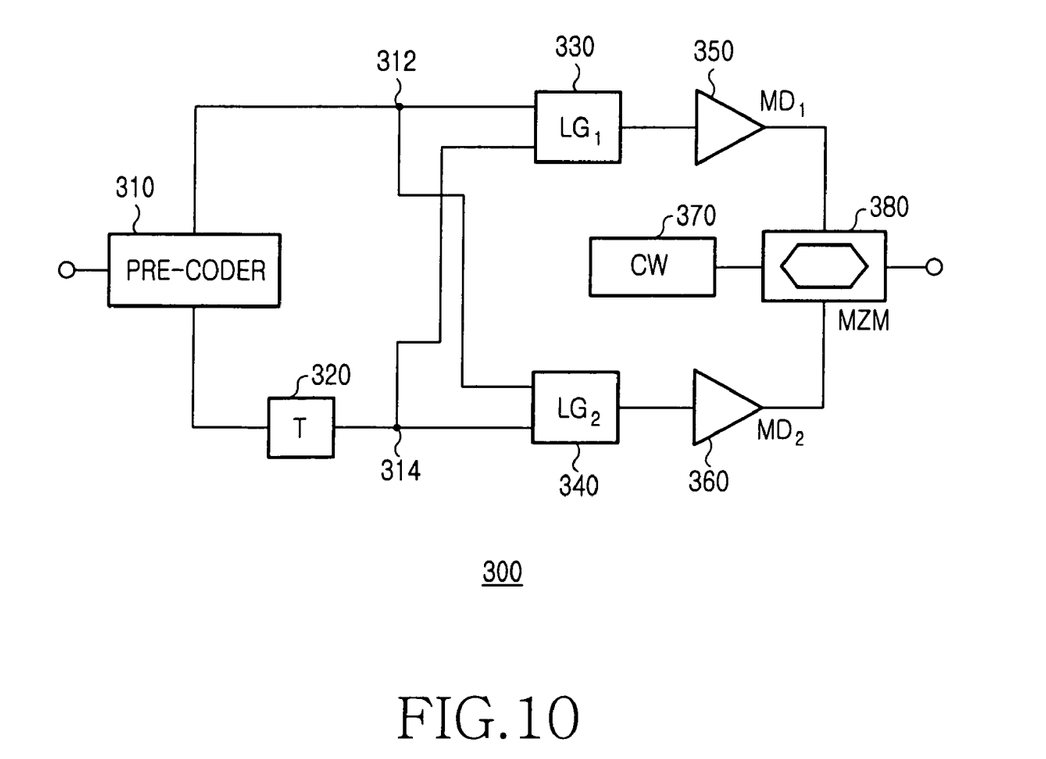
FIG. 10 is a block diagram showing a chirped RZ-AMI optical transmitter according to a second preferred embodiment of the present invention.

FIG. 10 is a block diagram showing a chirped RZ-AMI optical transmitter according to a second preferred embodiment of the present invention. The optical transmitter 300 has nearly the same construction as that of the optical transmitter 200 shown in FIG. 3. However, they differ in that the optical transmitter 300 uses only one delay, that delay being disposed at a different position. Accordingly, the following discussion focuses, for brevity, on these differences.

The optical transmitter 300 includes a pre-coder 310, first and a second branching means 312, 314, a delay 320, first and a second logic gate 330, 340, a first and a second modulator driver 350, 360, a CW laser 370, and an MZM 380.

The pre-coder 310 pre-codes input NRZ binary data, divides the pre-coded signal (or 2 level signal) into two signals, inverts one of the branch signals, and outputs the remaining branch signal (non-inverted signal) and the inverted signal.

The first branching means 312 divides the branch signal input from the pre-coder 310 into two branch signals.

The delay 320 delays the branch signal input from the pre-coder 310 by 0.5 bit, and outputs the delayed signal.

The second branching means 314 divides the delayed signal input from the delay 320 into two branch signals.

The first logic gate 330 receives one (first signal) of the branch signals having passed through the first branching means 312 and one (second signal) of the branch signals having passed through the second branching means 314, and logically operates on the received first and second signals to output a third signal.

The second logic gate 340 receives the remaining branch signal (fourth signal) having passed through the first branching means 314 and the remaining branch signal (fifth signal) having passed through the second branching means 312, and logically operates on the received fourth and fifth signals to output a sixth signal.

The first modulator driver 350 amplifies the third signal input from the first logic gate 330.

The second modulator driver 360 amplifies the sixth signal input from the second logic gate 340.

The CW laser 370 outputs a light having a predetermined wavelength and the MZM 380 outputs a chirped RZ-AMI optical signal obtained by modulating the light input from the CW laser 370 according to the amplified third and sixth signals.

The optical transmitter 300 may be realized by means of various combinations of the first and the second logic gates 330, 360.

The following table 2 represents formats and chirp signs for a fifth to an eighth combination. Description for each combination is omitted.

TABLE 2

| | First logic gate | Second logic gate | format | Sign of chirp |
|---|---|---|---|---|
| Fifth combination | NAND | OR | AMI | Positive |
| Sixth combination | OR | NAND | AMI | Positive |
| Seventh combination | AND | NOR | AMI | Negative |
| Eighth combination | NOR | AND | AMI | Negative |

According to the present invention as described above, a chirped RZ-AMI optical transmitter with a low price can be realized by using only one MZM without an expensive DI. Moreover, since the chirped RZ-AMI optical transmitter outputs a chirped RZ-AMI optical signal, the chirped RZ-AMI optical transmitter is tolerant to the non-linearity effect.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A chirped RZ-AMI (Return-to-Zero Alternate-Mark-Inversion) optical transmitter comprising:.
    a first logic gate for receiving a first signal obtained by pre-coding binary data and a second signal having a waveform obtained by inverting and delaying the first signal, and outputting a third signal obtained by logically operating on the first and the second signals;
    a second logic gate for receiving a fourth signal having a waveform obtained by inverting the first signal and a fifth signal having a waveform obtained by delaying the first signal, and outputting a sixth signal obtained by logically operating on the fourth and fifth signals; and
    a Mach-Zehnder Modulator (MZM) for modulating, according to the third and sixth signals, inputted light and outputting an RZ-AMI optical signal.

2. The chirped RZ-AMI optical transmitter as claimed in claim 1, wherein the binary data includes Non-Return-to-Zero (NRZ) signals.

3. The chirped RZ-AMI optical transmitter as claimed in claim 1, wherein each of the first and second logic gates comprises one logic gate selected from the group consisting of a NAND gate, an OR gate, an AND gate and a NOR gate.

4. The chirped RZ-AMI optical transmitter as claimed in claim 3, wherein the first and the second logic gates are identical.

5. The chirped RZ-AMI optical transmitter as claimed in claim 1, wherein the RZ-AMI optical signal has positive chirp, such that a phase of said optical signal increases when an intensity of said optical signal increases and such that said phase decreases when said intensity decreases, said phase being determined by a sum of waveforms of said third and sixth signals.

6. The chirped RZ-AMI optical transmitter of claim 5, configured such that an electric field of the chirped RZ-AMI optical signal is derivable by a difference between waveforms of said third and sixth signals.

7. The chirped RZ-AMI optical transmitter as claimed in claim 1, wherein the RZ-AMI optical signal has negative chirp, such that a phase of said optical signal increases when an intensity of said optical signal decreases and such that said phase decreases when said intensity increases, said phase being determined by a sum of waveforms of said third and sixth signals.

8. The chirped RZ-AMI optical transmitter as claimed in claim 1, further comprising:
    a pre-coder for generating a pre-coded signal by pre-coding the binary data, dividing the pre-coded signal into two branch signals, inverting a signal of the branch signals, and outputting the remaining signal of the branch signals and the inverted signal;
    a first branching means for dividing said remaining signal into two further branch signals, and outputting, to the first logic gate, a first of the further branch signals;
    a first delay for outputting, to the second logic gate, a signal generated by delaying the second of said further branch signals;
    a second branching means for dividing the inverted signal input from the pre-coder into two additional branch signals, and outputting, to the second logic gate, a first of said additional branch signals; and
    a second delay for outputting, to the first logic gate, a signal generated by delaying the second of said additional branch signals.

9. The chirped RZ-AMI optical transmitter as claimed in claim 8, wherein each of said first delay and said second delay are configured for the respective delaying by one half of a bit period.

10. The chirped RZ-AMI optical transmitter as claimed in claim 1, further comprising:
    a first modulator driver for amplifying said third signal and providing the amplified signal to the MZM; and
    a second modulator driver for amplifying said sixth signal and providing the amplified, sixth signal to the MZM.

11. A chirped RZ-AMI (Return-to-Zero Alternative-Mark-Inversion) optical transmitter comprising:
    a first logic gate for receiving a first signal obtained by pre-coding binary data and a second signal having a waveform obtained by inverting and delaying the first signal, and outputting a third signal obtained by logically operating on the first and the second signals;
    a second logic gate for receiving a fourth signal having a waveform identical to a waveform of the second signal and a fifth signal having a waveform identical to a waveform of the first signal, and outputting a sixth signal obtained by logically operating on the fourth and the fifth signals; and
    a Mach-Zehnder Modulator (MZM) for modulating, according to the third signal and sixth signals, inputted light and outputting an RZ-AMI optical signal.

12. The chirped RZ-AMI optical transmitter as claimed in claim 11, wherein the binary data includes Non-Return-to-Zero (NRZ) signals.

13. The chirped RZ-AMI optical transmitter as claimed in claim 11, wherein the first and the second logic gates are configured so as to respectively comprise two gates, said first logic gate comprising a first of said two gates, said second logic gate comprising a second of said two gates, said two gates being one of the following four combinations: a NAND gate and an OR gate, an OR gate and a NAND gate, an AND gate and a NOR gate, and a NOR gate and an AND gate.

14. The chirped RZ-AMI optical transmitter as claimed in claim 11, wherein the RZ-AMI optical signal has positive chirp, such that a phase of said optical signal increases when an intensity of said optical signal increases and such that said phase decreases when said intensity decreases, said phase being determined by a sum of waveforms of said third and sixth signals.

15. The chirped RZ-AMI optical transmitter as claimed in claim 11, wherein the RZ-AMI optical signal has negative chirp, such that a phase of said optical signal increases when an intensity of said optical signal decreases and such that said phase decreases when said intensity increases, said phase being determined by a sum of waveforms of said third and sixth signals.

16. The chirped RZ-AMI optical transmitter of claim 15, configured such that an electric field of the chirped RZ-AMI optical signal is derivable by a difference between waveforms of said third and sixth signals.

17. The chirped RZ-AMI optical transmitter as claimed in claim 11, further comprising:
  a pre-coder for generating a pre-coded signal by pre-coding the binary data, dividing the pre-coded signal into two branch signals, inverting a signal of the two branch signals, and outputting the remaining signal of the branch signals and the inverted signal;
  a first branching means for dividing said remaining signal into two further branch signals, outputting, to the first logic gate, a first of the further branch signals, and outputting, to the second logic gate, the second of the further branch signals;
  a delay for delaying and outputting the signal inverted by the pre-coder; and
  a second branching means for dividing the outputted signal of said delay into two additional branch signals, outputting, to the first logic gate, a first of said additional branch signals, and outputting, to the second logic gate, a second of said additional branch signals.

18. The chirped RZ-AMI optical transmitter as claimed in claim 17, wherein each of said first delay and said second delay are configured for the respective delaying by one half of a bit period.

19. The chirped RZ-AMI optical transmitter as claimed in claim 11, further comprising:
  a first modulator driver for amplifying said third signal and providing the amplified signal to the MZM; and
  a second modulator driver for amplifying said sixth signal and providing the amplified, sixth signal to the MZM.

20. A method for providing a chirped RZ-AMI (Return-to-Zero Alternate-Mark-Inversion) optical signal, the method comprising the steps of:
  receiving a first signal obtained by pre-coding binary data and a second signal having a waveform obtained by inverting and delaying the first signal;
  outputting a third signal obtained by logically operating on the first and the second signals;
  receiving a fourth signal having a waveform obtained by inverting the first signal and a fifth signal having a waveform obtained by delaying the first signal;
  outputting a sixth signal obtained by logically operating on the fourth and fifth signals; and
  modulating, according to the third and sixth signals, inputted light and outputting an RZ-AMI optical signal.

* * * * *